United States Patent

Härkönen et al.

[11] Patent Number: 5,612,277
[45] Date of Patent: Mar. 18, 1997

[54] CATALYST AND METHOD FOR MANUFACTURING THE SAME

[75] Inventors: Matti Härkönen; Thomas Slotte; Matti Kivioja, all of Oulu, Finland

[73] Assignee: Kemira OY, Espoo, Finland

[21] Appl. No.: 392,912

[22] PCT Filed: Aug. 27, 1993

[86] PCT No.: PCT/FI93/00338

§ 371 Date: Feb. 28, 1995

§ 102(e) Date: Feb. 28, 1995

[87] PCT Pub. No.: WO94/05424

PCT Pub. Date: Mar. 17, 1994

[30] Foreign Application Priority Data

Aug. 28, 1992 [FI] Finland ..................... 923855

[51] Int. Cl.⁶ ............... B01J 21/04; B01J 23/38; F01N 3/10
[52] U.S. Cl. ............ 502/325; 502/439; 502/339; 502/527; 422/175
[58] Field of Search ................. 502/325, 339, 502/439, 527; 422/175

[56] References Cited

U.S. PATENT DOCUMENTS

| | | | |
|---|---|---|---|
| 4,382,323 | 5/1983 | Chapman et al. | 29/157 R |
| 4,822,766 | 4/1989 | Cyron et al. | 502/439 |
| 5,043,311 | 8/1991 | Engler et al. | 502/439 |
| 5,061,464 | 10/1991 | Cordonna, Jr. et al. | 423/213.5 |

FOREIGN PATENT DOCUMENTS

| | | |
|---|---|---|
| 884977 | 5/1989 | Finland . |
| 884978 | 5/1989 | Finland . |
| 63-162045 | 7/1988 | Japan . |

*Primary Examiner*—Glenn A. Caldarola
*Assistant Examiner*—In Suk Bullock
*Attorney, Agent, or Firm*—Seed and Berry LLP

[57] ABSTRACT

A catalyst is made of at least two metal foil strips, the transverse corrugations having been formed in at least one of them. The metal foil strips are formed into a honeycomb containing channels. The strips are coated with a support or with supports, and at least one catalytically active agent such as a noble metal is added to the coated strips in order to produce a catalytic surface. In this case the catalytic surface has the physical structure derived from the coating. The honeycomb has at least two catalytic surfaces differing from each other with respect to at least the support or the physical structure.

16 Claims, 2 Drawing Sheets

CATALYST AND METHOD FOR MANUFACTURING THE SAME

TECHNICAL FIELD

The present invention relates to a catalyst and a method for its manufacture, wherein the catalyst is made of at least two metal foil strips, at least one of the strips having transverse corrugations, the metal foil strips being formed into a honeycomb which contains channels, the metal foil strips being coated with a support or supports, and at least one catalytically active agent such as a noble metal being added to the coated strips to produce a catalytic surface, in which case the catalytic surface has the physical structure derived from the coating.

BACKGROUND OF THE INVENTION

For treating gases, and in particular for purifying the polluting exhaust gases of combustion engines, there have been used various catalytic surfaces, mainly depending on the composition of the exhaust gases and the structure of the catalyst. The polluting components of exhaust gases are substantially composed of unburnt hydrocarbons, cracked hydrocarbons, carbon monoxide, and nitrogen oxides. The purpose of the catalyst is to cause the hydrocarbons and the carbon monoxide to oxidize, i.e. to burn as completely as possible to carbon dioxide and water, and the oxides of nitrogen to become reduced to elemental nitrogen. Exhaust gas often also contains small amounts of sulfur dioxide derived from the sulfur present in the fuel, the sulfur burning in the engine to sulfur dioxide.

The basic structure of a catalyst comprises a frame material, i.e. a carrier, which may be ceramic or a metal foil strip; a support layer, i.e. a so-called washcoat; and noble metals used as active agents. A ceramic frame is usually made up of one or two successively placed monolithic pieces or honeycombs, which have channels or conduits, separated from each other by thin walls and longitudinal relative to the gas flow direction. A honeycomb made of a metal foil strip is made either by winding or by stacking, in which case, after tight packing of the strips, the corrugations transverse to the strip, in at least in a portion of the strip, form channels or conduits in the gas flow direction. Typically a honeycomb is made up of a flat strip and a corrugated strip placed alternately.

When the purification of the exhaust gases of a gasoline engine is concerned, gamma aluminum oxide is commonly used as the support. In catalysts used for purifying exhaust gases of other types of engines, for example diesel engines and natural gas engines, it is also possible to use, for example, silica, i.e. silicon dioxide, and titania, i.e. titanium dioxide. Zeolites are also commonly used as supports in catalysts. The purpose of the support is to form a sufficiently large surface area for the catalytic agents such as noble metals, and often also to participate in the catalytic reactions. Depending on the support, such support properties having an effect on reactions may include an ability to bind sulfur dioxide gas or oxygen. The physical structure of the catalytic surface means, for example, the thickness of the support, the layered structure of the support, the porosity of the support, and other properties which are dependent on the coating technique used.

Various additives, such as earth alkali metals and lanthanides, are used for improving the properties of the support, for example its thermal stability. Cerium compounds are used in the support to improve the storage of oxygen. In application publication FI-884977, the cerium oxide content of a support is varied according to the form in which aluminum oxide is used as the support.

Application publication FI-884978 discloses a catalyst in which the catalytic surface contains as a support cerium oxide, platinum and palladium in addition to aluminum oxide. Application publication JP 63,162,045 discloses a catalyst which contains noble metals such as Pt, Pd and Rh in various concentrations and in the form of various salts. A flat metal foil and a corrugated metal foil are immersed in a slurry of $Al_2O_3$ to produce a washcoat layer. The metal foil strips are wound to form a honeycomb, one end of which is immersed in a Pt ammine solution and the other end into a $PdCl_2$ solution. Finally the entire catalyst is immersed in a solution of $RhCl_3$. Thus a honeycomb is obtained which has catalytic surfaces containing different noble metals in different parts of the honeycomb.

U.S. Pat. No. 4,382,323 discloses a metal catalyst in which different noble metals have been provided on different surfaces of an individual channel. The support on all surfaces is gamma aluminum oxide which has been stabilized with barium and to which cerium has been added to even out the need for oxygen during catalytic reactions.

It is also previously known to make two separate shorter honeycombs the supports and/or noble metals contained in them differing from each other. By placing the honeycombs in succession or within a common casing, a catalyst is obtained which has catalytic surfaces containing different noble metals in different parts of the catalyst.

The catalysts in accordance with the state of the art described above have the drawback that the support-dependent behavior of the noble metals has not been taken into account in them. It has namely been observed, surprisingly, that certain noble metals work optimally only in connection with certain supports. This surprising interaction promoting the catalytic action of a noble metal will be shown more clearly in the accompanying examples.

SUMMARY OF THE INVENTION

It is an object of the invention to provide a catalyst in which the interaction between individual noble metals and various supports is taken into account optimally. It is indeed an object of the invention to provide a catalyst which is better than present-day catalysts in its light-off properties, conversion, and other functions. These objects are achieved with the catalyst according to the invention, which is primarily characterized in that the honeycomb has at least two different catalytic surfaces having different supports or different physical structures.

According to the invention, catalytic surfaces with different supports are produced in one and the same honeycomb. The catalytic surfaces in a channel may be over the entire length of the channel longitudinally either similar or different. In addition, they may be present in transverse zones in a channel.

The invention is a consequence of the surprising observation that the preparing of an entity of a number of different supports and/or noble metals in one and the same channel is possible, and that the functioning of a catalyst thus obtained is substantially improved. In the catalyst according to the invention it is better possible to take into account the totality of all the catalytic reactions.

In an embodiment according to the invention, the flat and corrugated, tightly packed metal foil strips making up the honeycomb are coated, before being packed, separately by, for example spraying a washcoat from below upwards via nozzles onto a strip moving at an even speed, on both its sides (see FIG. 4). The coating can be done on each surface in either one or several zones. The sprayed washcoat surface or the surface consisting of zones may be different on the different sides of the same foil and different in the flat foil and in the corrugated foil. The aim of the invention is that in a channel contained in a catalyst the gas or liquid to be purified will come on two or more catalytic surfaces having different supports or different physical structures, in which case the several different chemical reactions taking place in the catalyst can be decentralized so that the functioning of the catalyst is improved as compared to the reactions taking place simultaneously in a channel homogenous with respect to the support.

The outcome of the invention is a better than conventional catalyst in which the whole made up of various supports and various active metals, in particular noble metals, has been taken into account.

The significance of the invention is emphasized especially when the adding of the noble metal to the support is carried out from a solution by chemisorption. In the chemisorption process, a metal foil strip coated with a support is immersed in a noble metal solution. Noble metal complexes or ions find their way to certain active sites on the surfaces of certain supports. Thus an especially homogenous dispersion or distribution of noble metal particles over the porous washcoat surface is obtained. The essential idea in the adsorption by chemisorption is that the concentration of noble metals in the solution decreases.

Another method of adding the noble metal is so-called wet adsorption, in which a metal foil strip coated with a support is immersed in a noble metal solution, in which process only that amount of noble metal which is contained in the liquid wetting the surface passes to the support. After the coated strip has been taken out of the solution, the strip is dried, whereupon the noble metal remains on the washcoat surface. In this case the dispersion of noble metal particles is not very homogenous, since the amount of noble metal at a given point of the surface depends on the thickness of the liquid film which was on the surface. The essential idea in wet adsorption is that the noble metal concentration in the solution does not change.

To obtain the same noble metal amount onto the surface of a catalyst in the chemisorption process it is possible to use noble metal solutions considerably more dilute than in the wet adsorption process. Since chemisorption is based on the adhesion of the noble metals by a chemical bond to the washcoat surface, chemisorption is not possible on surfaces which do not have the active sites required by chemisorption.

BRIEF DESCRIPTION OF THE DRAWINGS

The invention is illustrated in the accompanying drawings, in which.

DETAILED DESCRIPTION OF THE INVENTION

Figure 4:
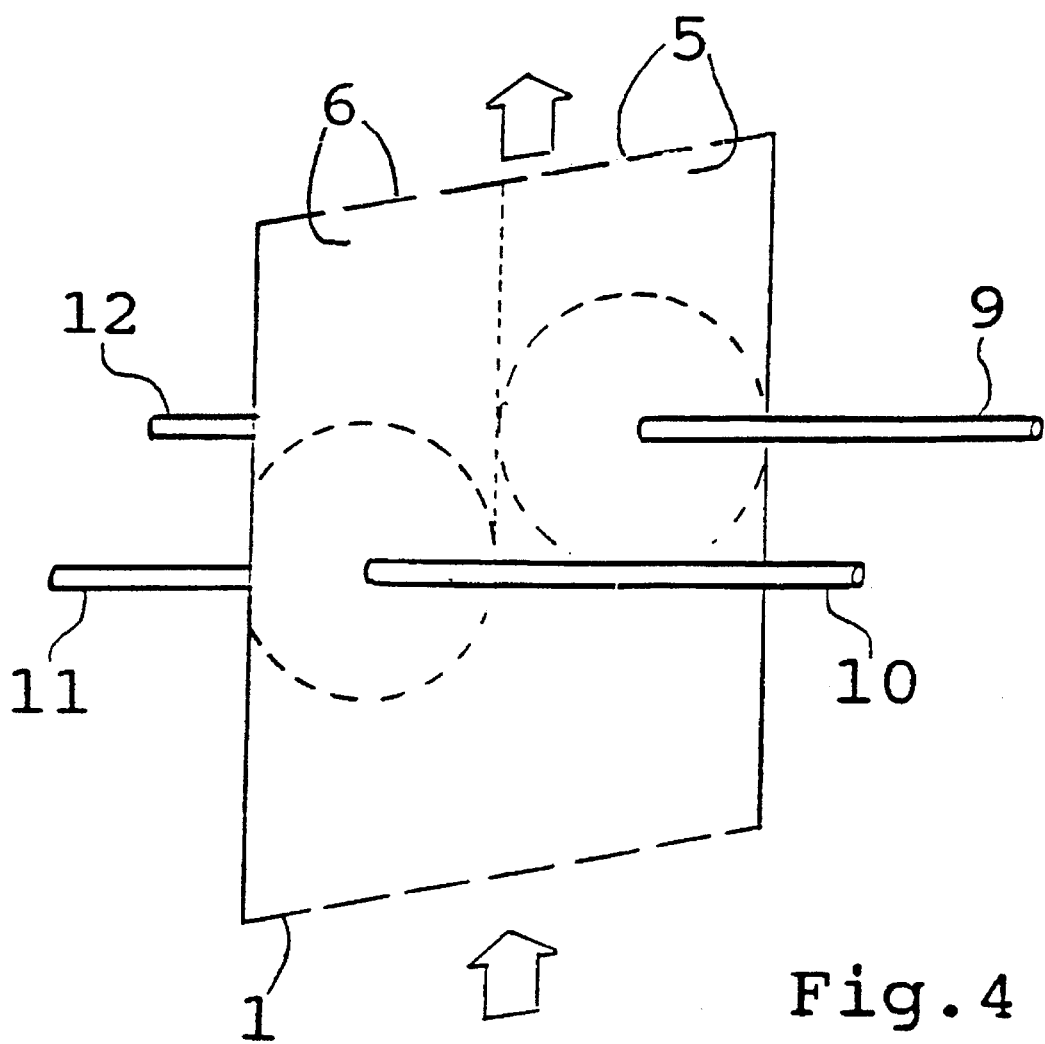
FIG. 4 depicts a method for the coating of a metal foil strip with different supports.

Before the making of a catalyst, the strips to be used are cleaned of any fats and are annealed. Thereafter, the manufacture of the catalyst according to the invention begins with the coating of open strips, either a flat strip and a corrugated strip or strips corrugated in an oblique and/or tortuous manner, or otherwise in different manners, so that later, when placed tightly one on top of the other, they will leave between the strips channels necessary for the through-flow of gas. The strips are coated separately. The coating can be done by any coating methods in use, in the manner of painting, for example by applying, by spraying or by immersing the piece to be coated in a slurry of a support. In the example case according to FIG. 4, a strip which is open and in a steady upward motion, indicated by arrows, is coated, the flat strip 1 and the corrugated strip separately, in the same manner. In the case depicted, there are on each side of the strip 1 two paint sprays 9, 10, respectively 11, 12, from which two different catalytic surfaces 5, 6 are obtained on each side of the strip 1. A similar washcoat is obtained at the same locations on both sides of the strip. FIG. 4 shows a case in which the widths of the catalytic surfaces 5, 6 on the same strip surface are equal. However, their mutual widths can be varied limitlessly, according to need in any given case, by turning or shifting the sprays and/or by adjusting the spraying conditions.

In the event that the support sprayed from the sprays 9 and 10 on the first side of the strip is the same, or only one spray is used on the first side of the strip, and a support different from that on the first side is sprayed respectively onto the other side of the strip, a coated strip is obtained in which the supports of the different sides are mutually different but are similar and uniform on the same strip surface.

Figure 1:
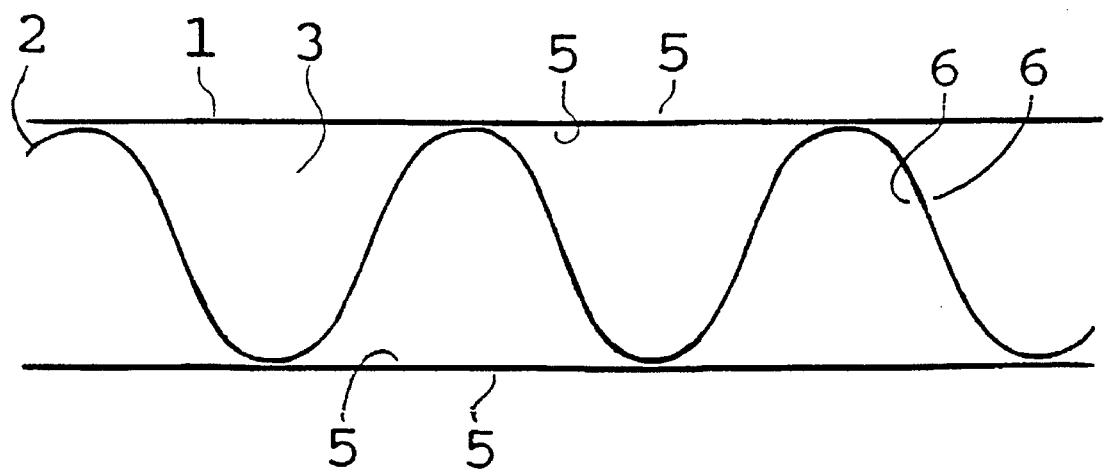
FIG. 1 is a cross sectional representation of a honeycomb having two different catalytic surfaces.
Figure 3:
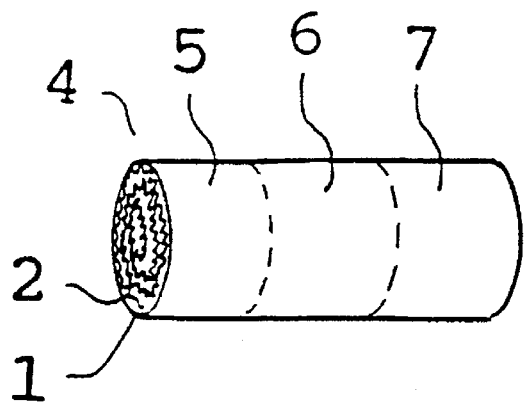
FIG. 3 depicts a honeycomb having three different catalytic surfaces in the form of transverse zones.

In FIG. 3, three parallel catalytic surfaces 5, 6 and 7 of different supports have been made on open strips by using either three different sprays in parallel, or by using two different sprays in parallel so that the first support is sprayed from the first spray and the second support from the second spray. In the latter case, the third catalytic surface having a support composition and washcoat thickness different from the others is made up of the partly overlapping spraying area of the above-mentioned supports. When the open strips are packed, for example by rolling, to form a tight honeycomb 4, different support zones 5, 6 and 7, successive in the gas flow direction, are obtained in the catalytic unit, as shown in FIG. 3. FIG. 1 depicts a detail as seen from the end of the honeycomb 4 of a catalyst. In this case, both sides of a flat strip 1 have a first support, and both sides of a corrugated strip 2 have a second support. When packed tightly, these form in each channel 3 two different catalytic surfaces 5 and 6.

Figure 2:
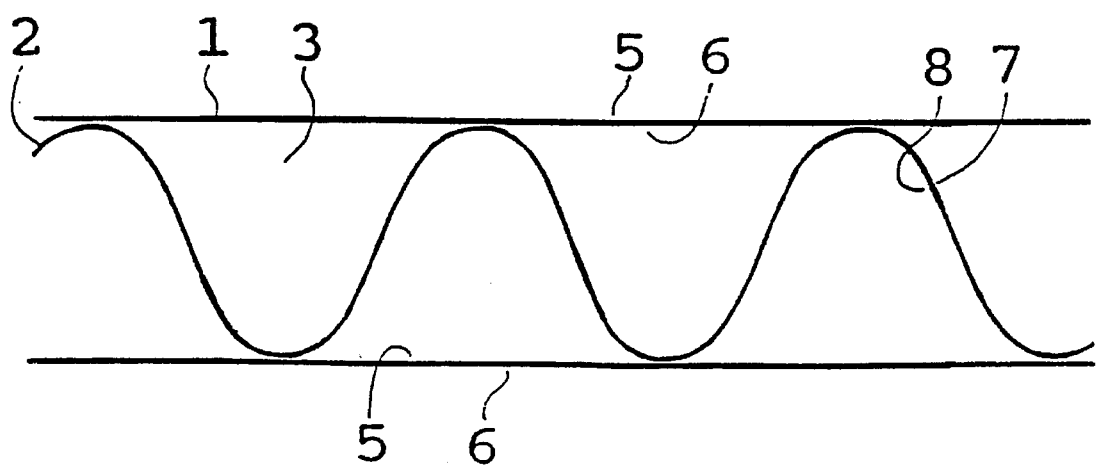
FIG. 2 is a cross sectional representation of a honeycomb having four different catalytic surfaces.

FIG. 2 shows a detail as seen from the end of the honeycomb of a catalyst. In this case, the first side 5 of a flat strip 1 is coated with a first support and its second side 6 with a second support. The first side 7 of the corrugated strip 2 is coated with a third support and its second side 8 with a fourth support. In this case, when packed tightly, the honeycomb comprises alternate channels the catalytic surfaces of which are 5 and 8 and, respectively, 6 and 7. In this case the gas flowing through has four different catalytic surfaces having support and noble-metal compositions optimal for specific reactions.

After coating the strips are dried and wound into a loose temporary roll, which is calcined. After calcination, impregnations with noble metals are carried out, for example according to the examples below.

One measurable quantity essential for the functioning of a catalyst intended for the purification of gases is the light-off temperature. This means the temperature at which 50% of a certain gas component, such as carbon monoxide (CO), hydrocarbons (HC), or oxides of nitrogen (NO$_x$), converts to the desired less detrimental component. Another important quantity is the conversion percentage of a certain component; this percentage is taken from the light-off curve at the temperature corresponding to the normal running temperature of the engine.

Example 1.

The first side of a flat strip is coated with an alumina-containing support and its second side with a silica-containing support, both sides of a corrugated strip with an alumina-containing support. A loose roll formed of these strips is impregnated with a Pd(NH$_3$)$_4$Cl$_2$ solution, and is washed with clean water and dried at 150° C. In this case, Pd will adhere to the silica, since it is bound to silica by chemisorption but, when washed, it will be rinsed off from the alumina, to which it does not bond. After drying, the roll is immersed in a Pt(NH$_3$)$_4$Cl$_2$ solution which has been oxidized with hydrogen peroxide. After the impregnation, the roll is washed with clean water and is dried. In this case, the Pt chemisorbed to the alumina will remain, but from the silica surface it will be rinsed off.

Thus Pd and Pt have been obtained separately on the different surfaces which will be in the same channel.

Example 2.

The functioning of natural-gas catalysts prepared on two different supports was compared, the noble metals being varied according to the following table. A first support was used in a flat strip and a second support in a corrugated strip.

The tests were performed using a gas mixture which contained methane 0.2, carbon monoxide 0.1, nitrogen monoxide 0.05 and oxygen 0.35% by volume, the balance being nitrogen.

Example 3.

The purpose of this example is to show the importance of the physical structure of the support on the operation of the catalyst when the noble metal concentrations in the catalyst are not changed. The thickness of the support was varied in the catalysts on which the experiment was carried out.

Catalysts which contained gamma alumina as the support and which were alike except for the thickness of the support were prepared according to the following table. Before testing, the catalysts were quick-aged hydrothermally at 850° C. for 4 hours, the composition of the gas being nitrogen 88%, water vapor 10%, and oxygen 2%. The testing was carried out in the exhaust gas of a gasoline engine.

TABLE 2

Effect of support thickness on the functioning of a catalyst

| Amount of support 400° C. (g/m$^2$) | Noble metal amounts (%) | | Light-off (°C.) | | | Conversion % at | | |
|---|---|---|---|---|---|---|---|---|
| | Pt | Rh | CO | HC | NO$_x$ | CO | HC | NO$_x$ |
| 18 | 0.198 | 0.043 | 255 | 279 | 265 | 99 | 90 | 100 |
| 41 | 0.202 | 0.042 | 231 | 264 | 242 | 99 | 95 | 100 |
| 57 | 0.209 | 0.043 | 230 | 254 | 234 | 97 | 93 | 97 |

It is observed that with a thicker support the catalyst can be caused to light off sooner. In testing cycles for measuring the quality of the catalytic function, in which the test begins with cold starting, rapid light-off is highly essential when the emissions are measured in g/km.

On the other hand, after the engine has warmed up and the catalyst has reached the normal operating temperature, the support thickness no longer has anything like the same

TABLE 1

Dependence of the functioning of a catalyst on noble metals and on their location.

| Exp. | Noble metals | Light-off (C.°) | | | Conversion % at 500° C. | | | Formation of NO$_2$ |
|---|---|---|---|---|---|---|---|---|
| | | CO | HC | NO | CO | HC | NO | |
| 1 | Pt 0.24% on flat foil Pt 0.24% on corrugated foil | 215 | 435 | 490 | 98 | 88 | 71 | yes |
| 2 | Pd 0.24% on flat fail Pd 0.24% on corrugated foil | 145 | 525 | 630 | 100 | 35 | 0 | no |
| 3 | Pt 0.24% on flat foil Pd 0.24% on corrugated foil | 170 | 490 | 535 | 100 | 56 | 0 | no |
| 4 | Pt 0.12% + Pd 0.12% on both foils | 177 | 525 | 630 | 100 | 38 | 0 | yes |

The formation of NO$_2$ means oxidation, occurring especially with a rich mixture (oxygen content over 0.5%), to NO$_2$ within a temperature range of 200°...300° C., which together with moisture leads to the formation of nitric acid and is a highly detrimental reaction.

It is observed that by separating the noble metals Pt and Pd from each other, to different surfaces, in the catalyst according to the present invention (Experiment 3), a clear overall improvement in the functioning of the catalyst is achieved. Especially the behavior of HC (=methane) and NO is important in the assessment of the quality of these catalysts. The running temperature of a natural gas engine is within a range of 400°...600° C., and so the CO gas has in each case been lit off sufficiently early.

importance. At high temperatures, at which the amount of exhaust gas is also higher, the speed of material transfer in the catalytic surface is a limiting factor. This limitation means that a support thicker than a certain limit value is not useful, since the exhaust gas will not have time to penetrate deep into the pores.

The examples show that a catalyst has to function in a variety of situations, in which one type of support and noble metal combination cannot function optimally. On the other hand, the inclusion of a number of different catalytic surfaces having different supports, different noble metals and/or different physical structures in one and the same channel will better enable a whole range of different catalytic reactions to be taken into account.

It should be noted in this connection that the functioning of a catalyst is based on the impinging of molecules against noble metal surfaces. The size of a catalyst for exhaust gases is usually dimensioned so that, when gas travels through the catalyst, there are on average about five impingings which result in reaction, and thus there is still sufficient capacity for a probability of impingings on different channel surfaces.

The noble metal compounds with which the catalytic surfaces are to be impregnated may be any usable noble metal compounds, since in the manufacturing process both wet adsorption and chemisorption are possible. The most common noble metal compounds are chloride, nitrate or ammine complex compounds.

The invention is not limited to the embodiments described above; it can be varied within the limits defined in the accompanying claims. Thus, for example, the catalyst may be used not only for gas reactions but also for chemical reactions taking place in a liquid phase.

What is claimed is:

1. A catalyst comprising at least two metal foil strips, at least one of the metal foil strips having corrugations transverse to a longitudinal direction of the metal foil strip, the metal foil strips being formed into a honeycomb containing channels, each of the metal foil strips being coated with a support to form a coated strip, and each coated strip having at least one catalytically active agent thereon, the support and catalytically active agent of each metal foil strip defining a catalytic surface of the respective metal foil strip, the catalytically active agent being a noble metal, the honeycomb comprises first and second catalytic surfaces, the first catalytic surface being different than the second catalytic surface.

2. A catalyst according to claim 1, wherein said coated strips have different noble metals added thereto to form the different first and second catalytic surfaces.

3. A catalyst according to claim 1, wherein the first catalytic surface has a first support and the second catalytic surface has a second support, the first support being different from the second support.

4. A catalyst according to claim 3, the first and second catalytic surfaces are arranged so that they constitute opposite inner surfaces of the channel in the honeycomb.

5. A catalyst according to claim 3, comprising two metal foil strips, a first metal foil strip being substantially flat and a second metal foil strip being substantially corrugated, the catalytic surfaces including first and second catalytic surfaces, the first catalytic surface is on the first metal foil strip and the second catalytic surface is on the second metal foil strip.

6. A catalyst according to claim 3, wherein the metal foil strips include a first metal foil strip, and the catalytic surfaces include first and second catalytic surfaces, the first catalytic surface is on a first side of the first metal foil strip and the second catalytic surface is on a second side of the first metal foil strip.

7. A catalyst according to claim 1 wherein the first and second catalytic surfaces extend substantially over the entire length of the metal foil strip and are on at least one surface of the metal foil strip.

8. A catalyst according to claim 1, wherein the supports used on the first and second catalytic surfaces are selected from the group consisting essentially of alumina, titania, silica, zeolite, and mixtures thereof.

9. A catalyst according to claim 1 wherein at least one noble metal is added to the coated strips by impregnation based at least partly on chemisorption.

10. A catalyst according to claim 4, wherein the first support has a first thickness and the second support has a second thickness, the first thickness being different from the second thickness.

11. A catalyst according to claim 7, wherein the first and second catalytic surfaces are located in the channel, the first catalytic surface having a support layer with a first thickness that is substantially different than a second thickness of the support layer of the second catalytic surface.

12. A catalyst according to claim 1, the catalyst being used with hydrocarbons containing methane gas, wherein the support and catalytically active agent are combined so as to remove the methane gas present in hydrocarbons.

13. A method for manufacturing a catalyst having first and second metal foil strips, in at least one of the metal foil strip there are formed corrugations transverse to a longitudinal direction of the at least one metal foil strip, the first and second metal foil strips are formed into a honeycomb which contains channels, the first metal foil strip is coated with a first support to form a first coated strip, and a first catalytically active agent that is a noble metal is added to the first coated strip to form a first catalytic surface, the second metal foil strip is coated with a second support to form a second coated strip, and a second catalytically active agent that is a noble metal is added to the second coated strip to form a second catalytic surface such that the honeycomb comprises the first and second catalytic surfaces that are different from each other.

14. A catalyst according to claim 2, wherein the first catalytic surface includes a first support and the second catalytic surface includes a second support, the first support being different from the second support.

15. A catalyst according to claim 2 wherein the first and second catalytic surfaces extend substantially over the entire length of the metal foil strip and are on at least one surface of the metal foil strip.

16. A catalyst according to claim 2 wherein at least one noble metal is added to the coated strips by impregnation based at least partly on chemisorption.

* * * * *